United States Patent [19]
Cimprich

[11] 3,835,591
[45] Sept. 17, 1974

[54] METHOD AND APPARATUS FOR CORRECTING DIMENSIONAL VARIATION IN A ROTATING TIRE

[75] Inventor: Francis J. Cimprich, Canton, Ohio

[73] Assignee: The B.F. Goodrich Company, Akron, Ohio

[22] Filed: May 14, 1973

[21] Appl. No.: 359,739

[52] U.S. Cl............ 51/106 R, 51/106 R, 51/165.72, 51/165.73, 51/266, 51/322, 157/13
[51] Int. Cl....................... B24b 49/06, B24b 49/12
[58] Field of Search......... 51/2 V, 2 AA, 99, 106 R, 51/165.72, 165.73, 165.74, 165.83, 165.85, 165.88, 165.91, 134.5 R, 266, 322, 323, 289 R; 157/13

[56] References Cited
UNITED STATES PATENTS

| | | | |
|---|---|---|---|
| 2,097,783 | 11/1937 | Cole................................ | 51/2 AA |
| 2,868,291 | 1/1959 | McMahan.......................... | 157/13 |
| 3,250,043 | 5/1966 | Finkl............................... | 51/134.5 R |
| 3,426,828 | 2/1969 | Neilsen............................. | 157/13 |
| 3,574,973 | 4/1971 | Rader............................... | 51/165.9 |
| 3,681,877 | 8/1972 | Shively............................ | 51/106 R |

*Primary Examiner*—Donald G. Kelly
*Attorney, Agent, or Firm*—Joseph Januszkiewicz

[57] ABSTRACT

The method and apparatus for reducing the radial runout of a rotating tire by grinding or cutting from the tread a portion thereof as determined by noncontacting optical inspection system which provides an electrical signal proportional to the amount of radial runout, which controls such grinding or cutting. A jet air stream is cooperative with the inspection system to assure a true signal is received unaffected by the heat generated by the grinding or cutting operation. The electrical signal from the inspection system is fed to a comparator which compares the signal with preset limits and thereafter can control the grinding or cutting operation.

12 Claims, 8 Drawing Figures

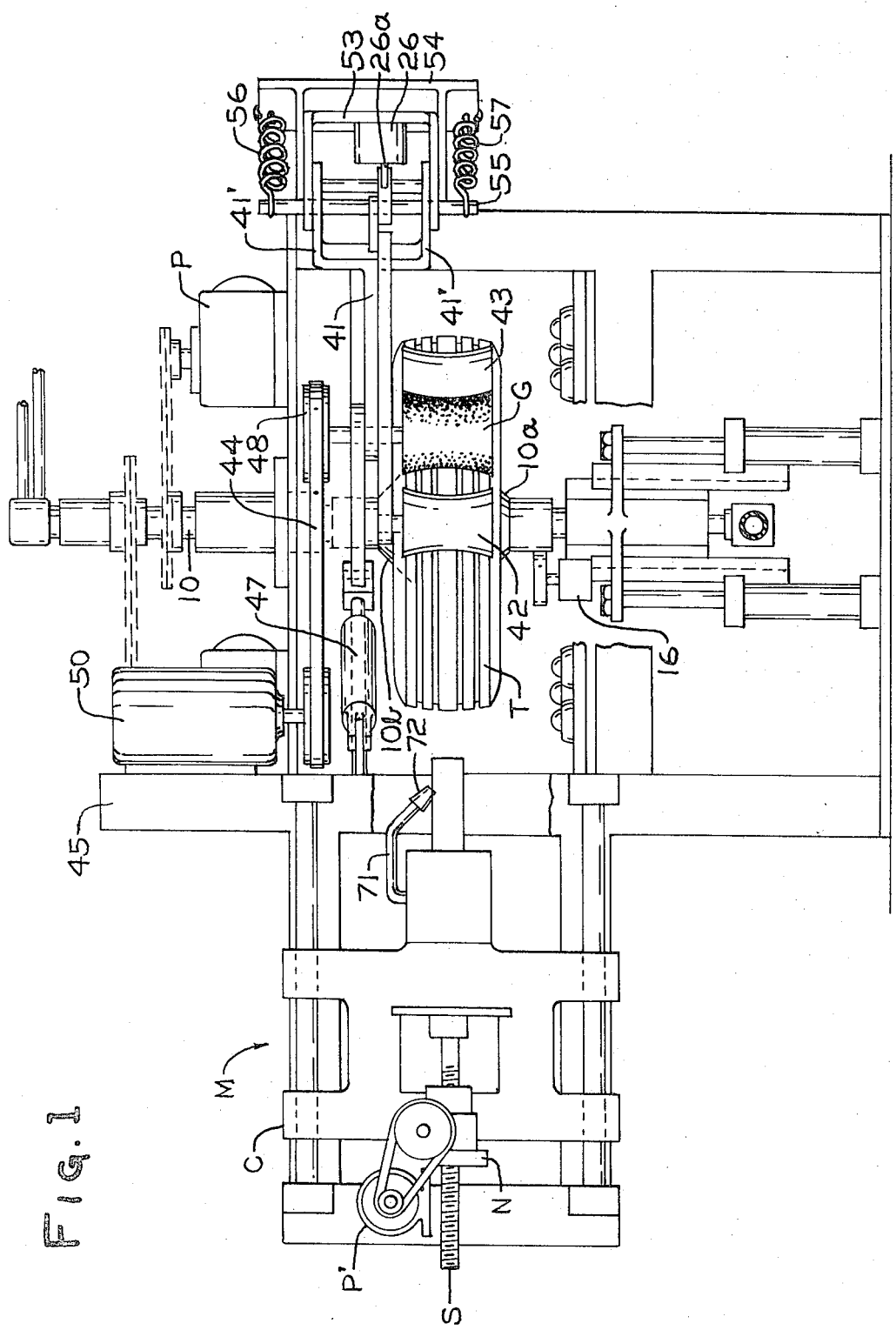

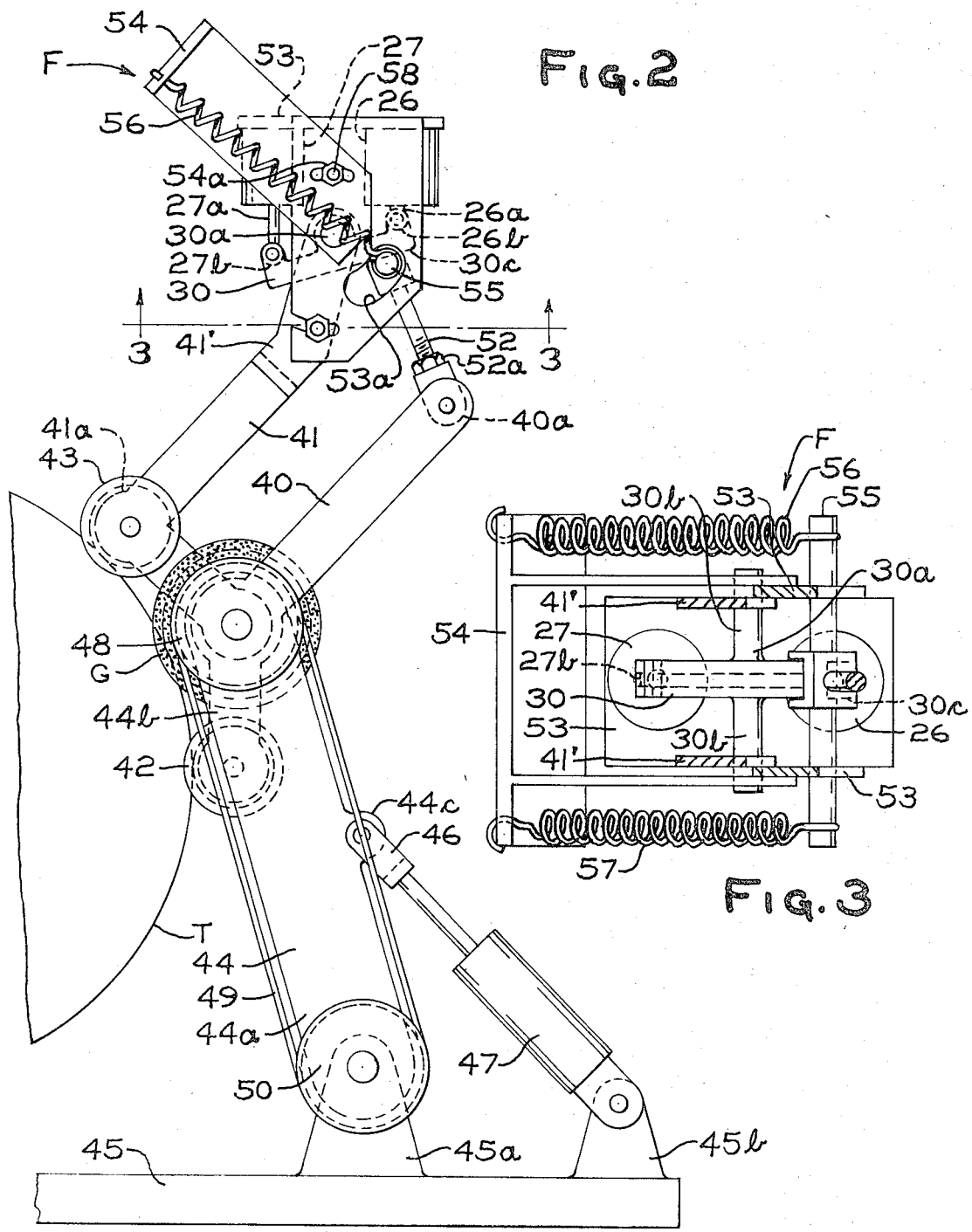

METHOD AND APPARATUS FOR CORRECTING DIMENSIONAL VARIATION IN A ROTATING TIRE

BACKGROUND OF THE INVENTION

This invention relates to an apparatus and method for correcting dimensional variations in tires employing a noncontacting inspection system for a tire.

In the manufacture of tires as well as through the use thereof, it is not infrequent that small degrees of out-of-roundness occurs which out-of-roundness is referred to as radial run-out. Such run-out causes vibration, uneven wear, and poor roadability. Even in the case of perfectly symmetrical balanced tires and where a vehicle is out of alignment, the tires will wear unevenly causing tire unbalance and further uneven wear. The high speeds at which vehicles now travel due to the continuing increase of interstate highways, it is extremely important to have tires that are uniform in their radial dimension.

Several types of machines are employed to correct radial run-out. One such machine employs a trimming knife that is moved transversely across the face of a tire while others employ a full face grinding wheel with the tire profile thereon to remove material therefrom.

In measuring tires for radial run-out it has been common to move a roller into direct contact with the rotating tire and have the roller connected to a differential transformer which, in turn, controls a servo-motor in accordance with the variation of output signal of the differential transformer. Such servo-motor controls a grinding wheel to correct the radial run-out. The difficiencies in such system are the accuracy and ability of the means for measuring the run-out.

SUMMARY OF THE INVENTION

The present invention contemplates an apparatus and method for measuring the radial run-out of a tire by a non-contacting means which supplies a signal for comparison to the desired limits and thereafter for actuation of a control circuit, which controls the means for removing the excess at the precise location of the out-of-roundness while simultaneously with such action a jet air stream is used to cool the tire at the portion where measurement is being taken.

BRIEF DESCRIPTION OF THE DRAWINGS

FIG. 1 is a side elevational view of a tire truing machine incorporating the present invention in its preferred embodiment;

FIG. 2 is a plan view of the grinder and actuator portion of the truing machine;

FIG. 3 is a cross-sectional view taken along lines 3—3 of FIG. 2;

DETAILED DESCRIPTION

Figure 4A:
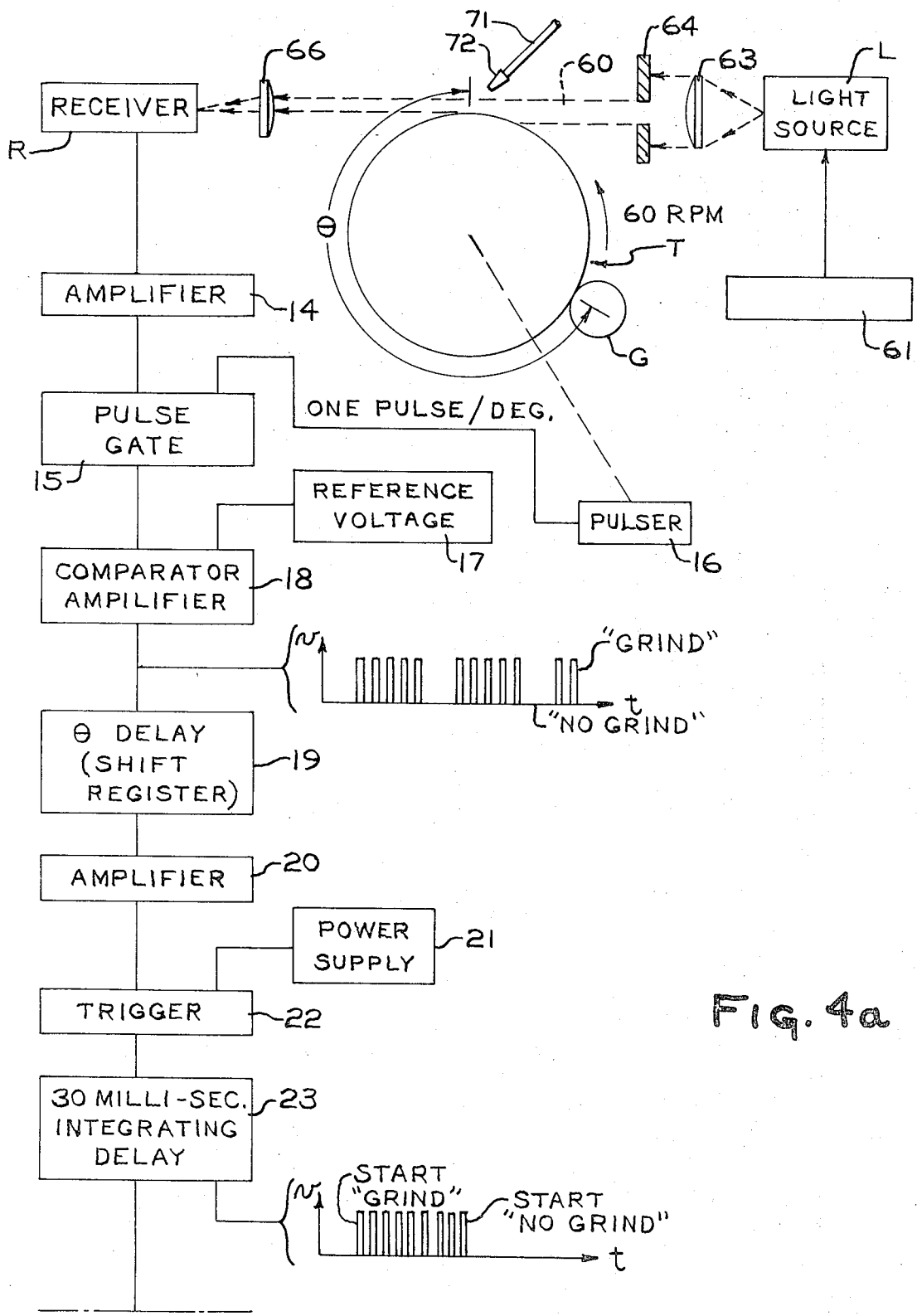
FIGS. 4a and 4b, when placed in vertical alignment, comprise a block flow diagram of the control circuit for operating the grinder, jet air stream and the noncontacting optical measuring system.

Referring now to FIG. 1, a tire testing machine M is shown in side view having a tire T mounted therein on a vertically disposed axle arrangement which provides the means for supporting and rotating a tire and includes two movable rotatable chuck plates 10a and 10b such that the tire may be mounted, inflated and rotated on shaft 10. A noncontacting optical measuring system or sensor including a light source L and a receiver R is mounted on a movable carriage C. The tire T is rotated by a power means P connected to its axle 10 and mounting chucks 10a and 10b of the tire.

The carriage C is shown in the retracted position in FIG. 1. A threaded power nut N is engaged with a threaded jack screw S attached to the carriage C and the threaded nut is rotated by a motor and transmission assembly P'. Rotation of the nut N causes the carriage C to be brought toward and away from the tire tread.

Referring now to FIGS. 2 and 3, the detail of a grinder mechanism is shown enlarged from FIG. 1 such that the description thereof may be more clearly understood. The grinder G is rotatably mounted on a lever 40 intermediate the ends thereof and a second lever 41 has one end pivotally attached to lever 40 at the point where the grinder G is mounted thereon. Levers 40 and 41 intersect and are pivotally attached such that each may be moved with respect to the other with the grinder G being free to rotate and unaffected in its rotation by the scissor-like movement of either levers 40 or 41.

One end of the lever 40 has a register means 42 attached thereto for making contact with the tire tread. Similarly the lever 41 has a portion 41a intermediate the ends thereof which portion has a second register means 43 attached thereto for making running contact with the tire tread. In the preferred form of the invention, the register means 42 and 43 comprises a pair of spaced idler rollers rotatably mounted respectively to levers 40 and 41. The rollers 42 and 43 are spaced closely adjacent on opposite sides of the grinder with the axis of rotation of each idler parallel to that of the grinder. In operation, scissoring the levers 40 and 41 moves the idlers toward or away from each other, thereby advancing or retracting the grinder G radially with respect to its position in relation to the tire tread. Levers 40 and 41 are scissored such that when the idler rollers 42 and 43 are advanced toward the center of the rotating tire the grinder G is thus retracted from grind position. When the levers 40 and 41 are scissored such that the idlers 42 and 43 are retracted away from the center of the tire, the grinder G is advanced toward and urged into contact with the tire tread for removing material therefrom.

The grinder and actuator assembly is supported by an elongated bar 44, see FIG. 2, having one end 44b pivotally attached to the intersection of lever-arms 40 and 41 and the other end of the bar 44 pivotally attached to a frame means 45 at a pivot mount 45a provided thereon for connecting to the said bar. The frame means comprises a portion of the frame of the machine shown in FIG. 1. The bar 44 has a mounting portion 44c intermediate the ends thereof with a clevis 46 pivotally attached thereto, which clevis is interconnected to an actuator 47 having one operative portion thereof pivotally connected to a second mounting portion 45b spaced from the pivot mount portion 45a on the frame 45. The actuator 47 may be a pneumatic or hydraulic power cylinder with one end connected to clevis 46 and the other end pivotally attached to the frame 45. In operation, power cylinder 47 operates to rotate the bar 44 about the pivot mount portion 45a of the frame such that the entire grinder assembly is moved toward or away from the rotating tire. The power cylinder 47 is operated to urge the grinder and idler rollers 42 and 43 into contact with the tire tread, it being determined by the scissored position of the levers 40 and 41 with respect to each other whether or not the grinder contacts the tire. However, the idler rollers 42 and 43 are preferably positioned such that initially the rollers engage the tire tread, the grinder G remaining spaced from the tire tread.

A pulley 48 is provided on the shaft of the grinder G and is operatively interconnected by means of a driving belt 49 to a power means such as a motor 50 rigidly attached to frame 45. Motor 50 has its shaft of rotation axially coincident with the center of pivot of the end 44a of the bar 44. This permits the bar 44 to be rotated about its pivotal attachment to the frame without changing the distance between the pulley 48 and the shaft of the motor, thus maintaining constant tension in the drive belt 49.

The free end of the lever 40 has a clevis 40a attached thereon. The free end of the lever 41 has a fork 41′ rigidly formed therein with the arms of the fork extending from the lever 41 in spaced mutually parallel arrangement with each arm of fork 41′ parallel to the length of the arm 41. A bellcrank 30 having ridigly mounted intermediate its ends a rigid pivot shaft 30a extending perpendicularly from the bell crank. The ends 30b of the shaft are rotatably mounted between the arms of the fork 41′ such that the pivot shaft 30a is parallel to the axis of rotation of the grinder. The bell crank 30 also has a portion 30c connected (FIG. 3) to one end of a linkage bar 52. The other end of the linkage bar 52 is pivotally attached to the clevis 40a on the end of the arm member 50. In operation, rotation of the bell crank 30 about its shaft 30a causes the linkage bar 52 to operate as a toggle for scissoring the ends of the arm members 40 and 41 with respect to each other. As described above, this movement then causes the idler rollers 42 and 43 to move together or further apart, thereby extending or retracting the grinder respectively away from or towards the center of the tire.

A U-shaped bracket 53, having each of its open ends adjustably attached to one end respectively of the fork 41′ (FIGS. 2 and 3) has mounted in the closed portion thereof actuator means 26 and 27 for rotating the bell crank. As described above with reference to FIGS. 4a and 4b, the actuator means comprise respectively a pair of electrical solenoids 26 and 27. Each solenoid has respectively an armature 26a and 27a extending therefrom with each armature having respectively a clevis 26b and 27b attached to the end thereof. The clevis 26b is attached to one arm of the bell crank 30 such that, upon electrical energizing, the solenoid 26 causes the armature 26a to retract, thereby rotating the bell crank in a direction such that the bar 52 causes lever-arms 40 and 41 to scissor with respect to each other in a manner spreading the idler rollers 42 and 43 further apart and permitting the grinder G to contact the tire. The clevis 27b is pivotally attached to an arm of the bell crank on the opposite side of the pivot shaft 30a from the clevis 26b. In operation, electrical actuation of solenoid 27 causes the armature 27a to retract, thus rotating the bell crank 30 in a direction such that the linkage 52 scissors lever arm members 40 and 41 in a manner converging idler rollers 42 and 43 toward each other thereby retracting the grinder G from material removing position.

Thus, the grinder G is advanced toward or retracted away from material-removing, or grinding, position b alternate actuation of the solenoids 26 and 27. The limitations of the actuating stroke of the solenoids thus determine the limit of radial travel of the grinder. The grinder thus operates in a succession of predetermined fixed radial movements toward or away from the time, with each movement providing the same depth of penetration of the grinder into the tire tread as the previous movement.

A snap-action means indicated by arrow F in FIG. 2 and FIG. 3 is provided to assist the toggle action of the bell crank 30 and the linkage bar 52 such that in the retracted or "no grind" position, the snap-action mechanism F is near the trip point. A small amount of movement of the armature 26a of the "grind" solenoid causes the snap-action mechanism F to go over center and provide a continuing force assist to movement of the bell crank 30. In the "grind" position the snap-action means is near the trip point for the return stroke such that a small amount of movement of the armature 27a of the "no grind" solenoid 27 causes the snap-action means to throw over center and give force assistance to the retracting stroke of the bell crank 30.

In the preferred form of the invention, the snap-action means F comprises a generally π-shaped frame 54 having the open ends of the sides thereof adjustably attached to the sides of brackets 53. A connecting bar 55 extends through the pivotal connection between the linkage bar 52 and the arm 30b of the bell crank and also extends through clearance holes 53a formed one in each side of the bracket 53 such that movement of the bell crank causes the bar 55 to move laterally within the clearance holes 53a. A pair of coil springs 56 and 57 is provided with the end of one spring attached each to one end of the bar 55 and the opposite end of the coil spring anchored to an extension of the closed end of the bracket 54. The springs are disposed such that snap-action occurs about a line through the pivot center of the bell crank passing through the end of the coil spring anchored to the bracket 54. The springs are thus positioned in mutually parallel arrangement and provide a snap-action of the bell crank 30 about its pivot axis. An adjustment means 58 is provided at the attachment of the bracket 54 to the bracket 53 such that the position of the coil springs may be changed for effecting a snap-action pivoting of the bell crank at a different position in its rotation. In the preferred form of the invention, the adjustment is provided by a slot 54a in each side of bracket 54 and a threaded bolt 58 attached respectively to each side of the bracket 53. The bracket 54 is pivotally mounted about the pivot center of the bell crank and it is attached to bracket 53 such that the attachment bolts 58 may be loosened and bracket 54 pivoted about the bell crank pivot center and the bolts 48 then tightened to secure the new position of the bracket 54 with respect to bracket 53 thus permitting variation in the snap position of the bell crank.

A further adjustment in the mechanism is provided by a sleeve nut 52a attached to the linkage bar 52 such that the bar may be lengthened or shortened by rotation of the sleeve nut.

In operation, the power cylinder 47 is actuated by an independent source to move arm 44 to bring the idler rollers 42 and 43 into running contact with the rotating tire T when it is desired to begin the material-removing cycle. The motor 50 may then be started to bring the grinder wheel G to the desired rotational speed.

The noncontacting optical inspection system includes a collimated beam of light 60 which is directed tangentially toward one peripheral portion of a tire T such that a portion of the light beam 60 is partially intercepted thereby.

The light beam 60 is produced by a power supply means and a high-frequency pulse modulator depicted by numeral 61 in FIG. 4a which is connected to a light source L from which the light beam 60 emanates. The output of light source L is directed through a lens 63 which collimates the light output into parallel rays. A control shutter 64 is located adjacent to the lens 63 having a narrow slit aperture 65 adjusted to permit passage of only the uniform central portion of the beam 60. Such beam 60 is projected tangentially past the upper peripheral portion of the tire as depicted by FIG. 4a with a portion of such tire obstructing the beam 60. The unintercepted portion of the beam 60 is projected through a focusing lens 66 toward a receiver or a light-energy responsive detector R which produces an electrical signal that is proportional to the quantity of light energy which is incident thereon. Such electrical signal varies in amplitude in accordance with the radial run-out of the surface portion which instantaneously intercepts the beam 60. Mounted on a suitable bracket of the frame of the machine is a conduit 71 having its one end connected to a suitable source of pressurized air and the other end suitably connected to a nozzle 72 which has the pressurized jet air stream directed therefrom toward the peripheral portion of the tire that intercepts the light beam 60 to dissipate the heat generated on the tire by any grinding or cutting thereon which would otherwise interfere with the passage of the light beam 60 from the light source L to the receiver R.

The interaction of the wavelength of the thermal energy from the heated tire interferes with the passage of the optical energy of light beam 60 since both are in the infrared region. Although energy is transmitted at all wavelengths throughout the electromagnetic spectrum, heating effects or thermal energy occur only over a very limited range. It extends from wavelengths around 2,000 angstroms to about 50,000 angstroms. The sensors of the receiver R here are infrared devices employing optical energy in the form of light emitting diodes.

The radiation energyof the high spots of the tire being ground or kissed by the grinding wheel drawn by a 20 horsepower motor is sufficient to form convection currents of heat transfer. A laminar sublayer forms on the surface of the tire covering the portion of the circumference where the grinding wheel touched. Such laminar sublayer continues to build up with each advance of the grinding wheel into the tire The use of pressurized air stream from nozzle 72 breaks down the natural convection type of boundary layer by forced convection thereby eliminating the interference to the passage of light beam 60 and thereby accurately gauging, sensing an providing an output signal by receiver R that accurately represents the actual radial run-out.

Figure 4B:
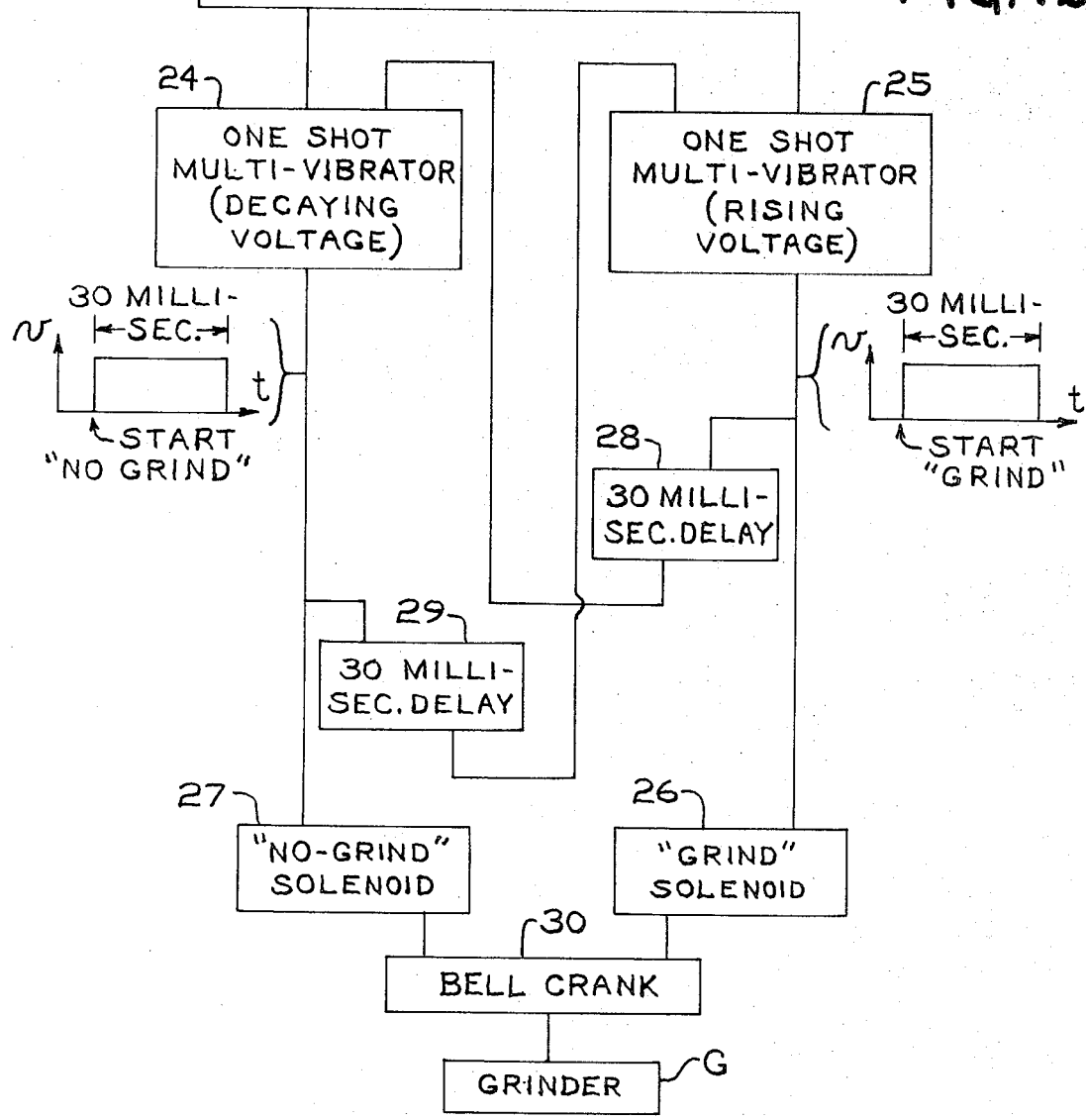

The signal from receiver R as shown by the digram of FIGS. 4a and 4b is fed to amplifier 14 and then to a pulse-gate 15. A pulse generating means, or pulser 16 (FIG. 1) is driven by the tire axle 10 such that rotation of the tire mounted thereon causes the pulse generator to transmit equal pulses with each pulse representing a unit angle of tire rotation. In the preferred practice of the invention, the pulse generator 16, or pulser, as it is labeled in FIG. 4a, has an output signal of one pulse per degree of tire rotation, which output is applied to the input of the pulse-gate. The pulser 16 may be of any convenient commercial type. In the present practice of the invention, a Rotaswitch Pulser, Model No. 815-P3431, manufactured by the Disc Instrument Company, has been used, but any other commercially available unit may be employed. Similarly, the pulse-gate 15 may be of any standard construction or type known in the art and it may be of semiconductor or vacuum-tube design. Operation of the pulse-gate 15 is such that the signals from the amplifier 14 are not transmitted by the pulse-gate unless the pulse-gate 15 is receiving pulses from the generator 16.

The signals passed from the pulse-gate 15 are then applied to a comparator amplifier 18 which receives also a voltage from a reference source 17. The comparator amplifier 18 operates as a summing amplifier such that the pulses are transmitted to its output only when the voltage signal from the sensors exceeds the level from the reference source 17. The reference voltage is a predetermined value to represent the maximum allowable limit of radial run-out which is permissible in the tire. When the signal from the sensors exceeds this level in magnitude, the pulses from the generator 16 are transmitted and used to initiate the grinder operation.

Signals from the comparator amplifier 18 are applied to the input of a delay means 19 which serves to delay the signal an amount in tire rotation time represented by the angular distance the tire must rotate for a point where the radial runout is measured to where the tire is to pass under a grinder G. This angular distance is represented in the upper right-hand portion of FIG. 4a by the Greek letter Theta $\theta$. The grinder G is located at a convenient position around the tire and delay means 19 is sued to synchronize operation of the grinder with passage of the point associated with a high radial run-out value, such that the grinder G does not operate until the point passes in rotation directly beneath the grinder.

The delay means 19 preferably comprises a static shift register which may be of conventional design known in the art and may be of vacuum-tube or semiconductor design or may employ relays. In the presently preferred practice the shift register is a Motorola static eight-bit shift register, Model MC845P. The pulse signals from the shift register are applied to a second amplifier 20 and subsequently applied to an electrical trigger 22 which is supplied power from the power supply 21. The trigger 22 serves to apply sufficient power to means for moving the grinder toward and away from the tire tread. The trigger 22 may be of any conventional construction known in the electrical art. In the preferred practice of the invention, a silicon control rectifier (SCR) firing circuit is employed with the signal from amplifier 20 applied to the gate junction of the SCR. The signal from the trigger is then applied to the grinder moving means through an intermediate integrating delay 23 and simultaneous application to a pair of intermediate single pulse generators 24 and 25.

The integrating delay 23 is preferably a 30 millisecond delay to prevent activation of either multivibrator upon receipt of a series of pulse signals of a duration less than 30 milliseconds. However, any convenient time value may be used for the delay 23, the choice being governed by the mechanical time response of the grinder mechanism in moving toward and away from the tire tread. The single pulse generators 24 and 25 are preferably one-shot multivibrators with the generator 24 operating only upon excitation by the decaying voltage portion of the pulse signal, the generator 25 being energized only upon receipt of the rising voltage portion of the pulse signal. The output of the multivibrator 24 is applied to an actuator (solenoid) 27 which retracts the grinder G from contact with the tire tread and the output of multivibrator 25 is applied to an actuator (solenoid) 26 which moves the grinder G to contact the tire tread. In the presently preferred practice of the invention, the actuators 26 and 27 each comprise an electrical solenoid having an armature therein with one end of each armature connected to bell crank 30 which, in turn, is connected to the grinder G.

In operation, when a signal from the multivibrator 25 is received, by the rising voltage of the first pulse in each group of pulses applied to the multivibrator, the solenoid 26 is activated, which causes the bell crank to move the grinder into material-grinding position. As the group of pulse passes, application of the decaying voltage portion of the last pulse in the group to multivibrator 24 causes the solenoid 27 to be activated, which in turn rotates the bell crank in the opposite direction, thereby retracting the grinder from material-grinding position.

The design of each of the multivibrators 24 and 25 is such that the pulse width of the output signal is greater than the time response of the grinder activating mechanism to prevent signals, which have a time duration less than the response capability of the solenoid activating device, from being applied to the solenoid. It will be readily apparent that such an arrangement is necessary to prevent chatter of the solenoid actuating mechanism.

The output of multivibrator 25 is also applied to a 30 millisecond delay 28 and the output thereof is fed back into the input of the decaying-voltage sensitive multivibrator 24. Similarly, the output of multivibrator 24 is applied also to a 30 millisecond delay 29 the output of which is fed back into the input of the multivibrator 25. This arrangement provides a cross-coupled delay feedback of the multivibrator outputs and in operation serves to prevent either multivibrator from activating for a period of time equal to the pulse width of the output of the multivibrators.

In FIG. 4b, the multivibrator 25 and solenoid 26 which cause the grinder to move into contact with the tire are labeled as a "grind" function and the multivibrator 24 and solenoid 27 for retracting the grinder from material grinding position are labeled as the "no grind" function. Referring, in FIGS. 4a and 4b, to the electrical output of comparator amplifier 18, the maximum voltage of the pulse signals therefrom represents a "grind" signal and the zero voltage level between pulse groups represents the "no grind" portion of the signal. With respect to the signal applied to the input of the multivibrators, the rising voltage side of the pulse group represents the "start grind" function and the decaying voltage side of the pulse group represents the "start no-grind" function.

Figure 6:
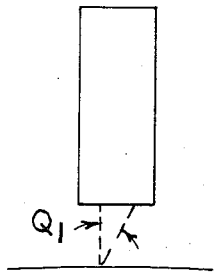
FIGS. 6 and 7 are schematic modified forms of noncontacting measuring means.
Figure 7:
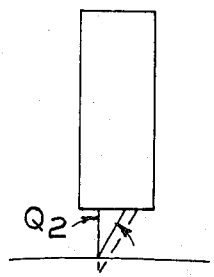
Figure 5:
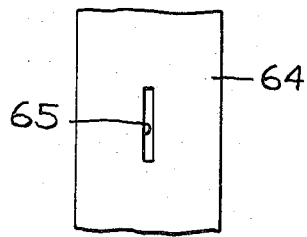
FIG. 5 is a fragmentary front view of the shutter for the optical measuring system.

Upon receipt of electrical pulse signal from the one-shot multivibrator 25 the "grind" solenoid 26 is actuated to rotate the bell crank, thereby scissoring lever arms 40 and 41 such that the idler rollers 42, 43 are moved farther apart and the rotating grinder G is moved a predetermined distance into contact with the tire tread for removing material in the tread region. When an electrical pulse signal is received from the one-shot multivibrator 24 by the "no-grind" solenoid 26, the armature of the solenoid is actuated to rotate the bell crank 30 in a direction such the lever arms 40, 41 are scissored and the idler rollers 42, 43 are moved closer together thereby retracting the grinder G from material removing position. Thus, alternate actuation of the "grind" solenoid 26 and the "no grind" solenoid 27 provides movement of the rotating grinder G a predetermined distance into and away from the material-removing position. Springs 56 and 57 provide a snap-action force assist to rotation of the bell crank. Upon completion of the grinding cycle, e.g., when the magnitude of signals from receiver R are no longer in excess of the reference voltage for the predetermined minimum time duration, the power cylinder 47 is actuated to pivot arm 44 and move the grinder assembly out of material-removing position, in a direction radially outward of the tire, such that the idler rollers no longer run against the rotating tire. In lieu of the non-contacting optical inspection system shown, a modification of such system may include a helium neon laser noncontacting optical system wherein the transmitter and receiver unit R, as depicted by FIG. 6, of such unit measures the reflected angle $Q_1$ and such angle produces an electrical signal that is proportional to subtended arc. Where the thickness of the tread is greater (exaggerated in FIG. 7 for clarity sake) the subtended arc as received by the receiver unit R is less (as $Q_2$) and correspondingly produces a signal that is correspondingly less. In this instance the output signal from receiver R can be fed to an inverter unit which provides an output signal that is inversely proportional to the input to unit R so that the output fed to amplifier 14 is proportional to the radial run-out of the tire T thereby operative to actuate the grinder G as described in the original embodiment.

The operation of the present invention thus provides actuators controlled by a noncontacting optical system for moving the grinder a predetermined and fixed distance into contact with, and away from the tire tread upon receipt of a "grind" or a "no grind" signal to the respective actuators. This technique is in contrast to a system using direct contacting of the tire T which is not accurate to the degree possible with noncontacting measurements. The grinder in the present invention thus is urged into contact with the tire, grinds for a time determined by the pulse width of an electrical "grind" signal and then is retracted from the grind position until receipt of another "grind" signal coupled with the air jets which facilitate accurate readings by the noncontacting optical measuring system.

Modifications and adaptions of the invention may be made by those having ordinary skill in the art with the invention being more particularly defined by the following claims.

I claim:

1. An apparatus for reducing the magnitude of radial run-out in a pneumatic tire comprising: Chuck means for supporting and rotating a tire in an inflated condition about its axis; means responsive to radial run-out in the rotating tire to provide an output signal that is proportional to the run-out variation; said last mentioned means includes a sensing means and a light source operative to direct a narrow beam of rays tangentially across a surface of a tire to provide said output signal; tread removing means supported adjacent the tire for movement a predetermined distance to and from engagement therewith for removing a portion of the tire tread when engagement therewith; circuit means responsive to said output signal for moving said tread removing means; and cooling means mounted midway between said sensing means and said light source for directing coolant toward said chuck means and the periphery of a tire mounted thereon to intersect the tire where said beam of rays intercepts said tire to provide a cooling of the surface of a tire thereof.

2. An apparatus for reducing the run-out of a tire as set forth in claim 1 where said coolant means is an air jet for directing a stream of air toward a tire on said chuck for breaking up boundary layer to eliminate the interference to the passage of said beam of rays.

3. An apparatus for reducing the run-out of a tire as set forth in claim 2 wherein said sensing means is an infrared device.

4. An apparatus for reducing the run-out of a tire as set forth in claim 3 wherein said circuit means includes means for providing a reference voltage representative of a minimum level of said run-out variation; means responsive to the onset of that portion of said output signal in excess of said reference voltage for initiating movement of said tread removing means into engagement with the tire; and means responsive to the recession of said signal below said reference voltage to withdraw said material removing means from contact with the tire.

5. An apparatus for reducing the run-out of a tire as set forth in claim 4 wherein said tread removing means is spaced peripherally a distance along the tire tread from a point midway between said sensing means and said light source; and said means responsive to onset of that portion of said signal in excess of the reference voltage includes means to delay actuation of said tread removing means an amount in tire rotation time corresponding to the said distance between said means to provide said output signal and said tread removing means.

6. A tire truing machine comprising support means, chuck means mounted on said support means for rotation about a central axis, motive drive means connected to said chuck means for rotating said chuck means and a tire thereon, tool means mounted on said support means for movement toward and away from said central axis of said chuck means for removing of material from a tire held by said chuck means, means for directing radiant energy from a source tangentially toward the periphery of a tire held by said chuck means, a sensing means operative to receive all or part of said radiant energy to provide an output signal proportional to the radial run-out of a tire mounted on said chuck means, circuit means operative to move said tool means toward and away from said central axis of said chuck means in response to said output signal, air jet means operative to direct coolant means toward said chuck means and a tire mounted thereon for cooling the periphery of a tire in which said radiant energy impinges, and said air jet means located between said sensing means and said means for directing radiant energy in a noncontacting relationship relative to a tire mounted on said chuck.

7. A method of truing tires comprising the steps of inflating a tire, rotating said inflated tire about its central aixs, measuring the radial run-out by a noncontacting optical system, removing the material at such high portions indicated by said optical system to true the tire, and simultaneously direct a jet of air toward the periphery of the tire at the area of measurement by the noncontacting system.

8. A method of truing a tire as set forth in claim 1 wherein said measuring includes the directing of a light beam tangentially of a tire for interception of a portion of such tire.

9. A method of truing a tire comprising the steps of inflating a tire, rotating such tire about its central axis, measuring the radial run-out by a noncontacting optical system, comparing the radial run-out with a reference base, removing portions of the periphery of a tire in response to the comparison made between said radial run-out and said reference base, and cooling that portion of the tire being measured by the noncontacting optical system.

10. A method of truing a tire as set forth in claim 9 wherein said cooling of the tire is by a jet air stream directed at said tire.

11. A method of reducing the magnitude of radial run-out in a pneumatic tire comprising:
   a. inflating the tire and rotating it about its axis;
   b. measuring the radial run-out by a noncontacting optical system;
   c. providing an electrical signal, the amplitude and duration of which is representative of the radial run-out variation of the rotating tire;
   d. engaging the tread of the rotating tire to a predetermined depth in the locality productive of said signal with a means for removing rubber from the tread region in response to said signal and continuing the engagement of the material-removing means for that portion of a single revolution of the tire corresponding to the time in which said signal is in excess of a predetermined minimum;
   e. cooling said tire as said removing of rubber is continued to eliminate the radial run-out; and
   f. continuing rotation of the tire and operation of said material-removing means until the maximum radial runout variation signal is less than said predetermined minimum.

12. The method defined in claim 11, further comprising delaying said engagement of the tire with said means for removing material from the tread region until the amplitude of said electrical signal is in excess of a predetermined minimum and the duration exceeds a predetermined minimum time.

* * * * *